(12) United States Patent
Chu et al.

(10) Patent No.: US 9,848,502 B1
(45) Date of Patent: Dec. 19, 2017

(54) HINGE ASSEMBLY AND FOLDABLE DISPLAY DEVICE USING THE SAME

(71) Applicant: SHIN ZU SHING CO., LTD., New Taipei (TW)

(72) Inventors: Jui-Lin Chu, New Taipei (TW); Kuo-Jung Hsu, New Taipei (TW)

(73) Assignee: Shin Zu Shing Co., Ltd., New Taipei (TW)

(*) Notice: Subject to any disclaimer, the term of this patent is extended or adjusted under 35 U.S.C. 154(b) by 0 days.

(21) Appl. No.: 15/468,202

(22) Filed: Mar. 24, 2017

(51) Int. Cl.
| | |
|---|---|
| *G06F 1/16* | (2006.01) |
| *H05K 5/00* | (2006.01) |
| *H05K 7/00* | (2006.01) |
| *H05K 5/02* | (2006.01) |
| *F16C 11/04* | (2006.01) |
| *E05D 3/14* | (2006.01) |
| *E05D 7/00* | (2006.01) |

(52) U.S. Cl.
CPC ............ *H05K 5/0226* (2013.01); *E05D 3/14* (2013.01); *E05D 7/00* (2013.01); *F16C 11/04* (2013.01); *H05K 5/0017* (2013.01); *E05Y 2900/606* (2013.01)

(58) Field of Classification Search
CPC .. G06F 1/1652; H05K 5/0226; H05K 5/0017; E05D 3/14; E05D 7/00
USPC .............. 361/679.21–679.3, 679.55, 679.56; 455/575.1–575.9
See application file for complete search history.

(56) References Cited

U.S. PATENT DOCUMENTS

| | | | |
|---|---|---|---|
| 42,473 A | 4/1864 | Hartman, Jr. | |
| 96,678 A | 11/1869 | Dalbey | |
| 139,355 A | 5/1873 | Barton | |
| 267,450 A | 11/1882 | Normandin | |
| 271,486 A | 1/1883 | Lyon | |
| 345,195 A | 7/1886 | Urie | |
| 362,958 A | 5/1887 | Hall et al. | |
| 6,577,496 B1* | 6/2003 | Gioscia | G06F 1/1616 345/156 |
| 8,605,421 B2* | 12/2013 | Verschoor | G06F 1/1652 361/679.21 |
| 8,971,031 B2* | 3/2015 | Mok | G06F 1/1652 349/58 |
| 9,348,450 B1* | 5/2016 | Kim | G06F 1/1681 |
| 9,557,771 B2* | 1/2017 | Park | G06F 1/1641 |
| 9,710,033 B2* | 7/2017 | Yamazaki | G06F 1/1635 |
| 9,733,744 B2* | 8/2017 | Lee | G06F 3/0412 |

(Continued)

*Primary Examiner* — Anthony Haughton
(74) *Attorney, Agent, or Firm* — Alan D. Kamrath; Kamrath IP Lawfirm, P.A.

(57) ABSTRACT

A foldable display device includes a first plate member, a second plate member, a hinge assembly, and a flexible display member. The first plate member includes a first display surface and a first side. The second plate member includes a second display surface and a second side. The first side and the second side are close to each other. A first hinge member and a second hinge member of the hinge assembly are respectively connected to the first plate member and the second plate member. The flexible display member includes a first portion, a second portion, and a middle portion. The first portion contacts the first display surface. The second portion contacts the second display surface. The middle portion is between the first side and the second side. The first and second hinge members rotate relatively to have the flexible display member spread to be flat.

15 Claims, 9 Drawing Sheets

(56) References Cited

U.S. PATENT DOCUMENTS

| | | |
|---|---|---|
| 9,760,126 B2 * | 9/2017 | Shin ...................... G06F 1/1652 |
| 2011/0271486 A1 | 11/2011 | Wang et al. |
| 2012/0042473 A1 | 2/2012 | Wang et al. |
| 2012/0096678 A1 | 4/2012 | Zhang et al. |
| 2013/0139355 A1 | 6/2013 | Lee et al. |
| 2015/0267450 A1 | 9/2015 | Chiang |
| 2015/0345195 A1 | 12/2015 | Park |
| 2015/0362958 A1 | 12/2015 | Shang |

\* cited by examiner

HINGE ASSEMBLY AND FOLDABLE DISPLAY DEVICE USING THE SAME

FIELD OF THE INVENTION

The present invention relates to a display device and, more particularly, to a hinge assembly and a foldable display device using the same.

BACKGROUND OF THE INVENTION

Please refer to FIG. 1. FIG. 1 illustrates a perspective view of a foldable display device 20a according to prior art. The conventional foldable display device 20a comprises a first plate member 500a and a second plate member 600a pivotally connected to each other and capable of being folded and spread. A flexible display member 700a is disposed on a front face of the first plate member 500a and the second plate member 600a. When the first plate member 500a and the second plate member 600a are folded relatively, the flexible display member 700a completely attaches to a front face 501 of the first plate member 500a and a front face 601 of the second plate member 600a, and a middle portion 730a of the flexible display member 700a attaches to a side 502 of the first plate member 500a and a side 602 of the second plate member 600a. However, when the first plate member 500a and the second plate member 600a are spread relatively to form a surface, the sides 502, 602 of the first plate member 500a and the second plate member 600a close to each other become closer than their previous posture. It causes the middle portion 730a of the flexible display member 700a (i.e., the portion attaching to the sides 502, 602 of the first plate member 500a and the second plate member 600a when the first plate member 500a and the second plate member 600a are folded relatively) to hump such that the flexible display member 700a forms an uneven surface. As a result, the experience of use is bad, the image displaying is uneven, and the lifespan of the flexible display member is shortened.

In addition, a kind of hinge with four gears is disclosed in published US patent applications with publication nos. 2012/0096678, 2011/0271486, 2012/0042473, 2013/0139355, and 2015/0345195. These hinges can be applied to portable devices; however, these hinges cannot be applied to flexible displays. The issue that a middle portion between two plate members (i.e., a base and a cover) of the flexible display humps when the two plate members are spread to form a surface is still not solved. Another driving device between two main axles of a hinge is disclosed in published US patent applications with publication nos. 2015/0362958 and 2015/0267450; however, it does not solve the issue of humping of the flexible display.

SUMMARY OF THE INVENTION

To address the above issue, the present invention aims to provide a hinge assembly and a foldable display device using the hinge assembly so as to have a flexible display member form an even, flat surface when the foldable display device is in a spreading state.

According to an embodiment of the present invention, a hinge assembly comprises a first hinge member and a second hinge member. The first hinge member comprises a first main axle, a first subordinate axle, a first main arm, and a first subordinate arm. The first main axle comprises a first main gear. The first main gear is around and fixed to the first main axle. The first subordinate axle comprises a first subordinate gear. The first subordinate gear is around and fixed to the first subordinate axle. The first subordinate gear is engaged with the first main gear. An end of the first main arm is connected to the first main axle and another end of the first main arm is provided with a first main sliding unit. An end of the first subordinate arm is pivotally connected to the first subordinate axle and another end of the first subordinate arm is provided with a first subordinate sliding unit. The first subordinate sliding unit and the first main sliding unit are slidably connected to each other. The second hinge member is symmetrical to the first hinge member. The second hinge member comprises a second main axle, a second subordinate axle, a second main arm, and a second subordinate arm. The second main axle comprises a second main gear. The second main gear is around and fixed to the second main axle. The second subordinate axle comprises a second subordinate gear. The second subordinate gear is around and fixed to the second subordinate axle. The second subordinate gear is respectively engaged with the second main gear and the first subordinate gear. An end of the second main arm is connected to the second main axle and another end of the second main arm is provided with a second main sliding unit. An end of the second subordinate arm is pivotally connected to the second subordinate axle and another end of the second subordinate arm is provided with a second subordinate sliding unit. The second subordinate sliding unit and the second main sliding unit are slidably connected to each other.

According to an embodiment of the present invention, a hinge assembly comprises a bracket plate. The bracket plate is provided with a first hinge member and a second hinge member. The first hinge member comprises a first main axle and a first subordinate arm. The first main axle is pivotally disposed on the bracket plate. The first main axle comprises a first main arm. An end of the first main arm is connected to the first main axle and another end of the first main arm is provided with a first main sliding unit. An end of the first subordinate arm is pivotally connected to the bracket plate and another end of the first subordinate arm is provided with a first subordinate sliding unit. The first subordinate sliding unit and the first main sliding unit are slidably connected to each other. The second hinge member comprises a second main axle and a second subordinate arm. The second main axle is pivotally disposed on the bracket plate. The second main axle comprises a second main arm. An end of the second main arm is connected to the second main axle and another end of the second main arm is provided with a second main sliding unit. An end of the second subordinate arm is pivotally connected to the bracket plate and another end of the second subordinate arm is provided with a second subordinate sliding unit. The second subordinate sliding unit and the second main sliding unit are slidably connected to each other.

According to an embodiment of the present invention, a foldable display device comprises a first plate member, a second plate member, an above hinge assembly, and a flexible display member. The first plate member comprises a first display surface and a first side at a side of the first display surface. The second plate member comprises a second display surface and a second side at a side of the second display surface. The first side and the second side are close to each other. The first hinge member of the hinge assembly is connected to the first plate member. The second hinge member of the hinge assembly is connected to the second plate member. The flexible display member comprises a first portion, a second portion, and a middle portion. The first portion contacts the first display surface. The second portion contacts the second display surface. The middle portion is between the first side and the second side. The first plate member and the second plate member are folded when the first hinge member and the second hinge member rotate relatively to a closing angle. The first plate member and the second plate member respectively slide in reverse directions and move a distance when the first hinge member and the second hinge member rotate relatively to a spreading angle such that the first side and the second side are spaced from each other to have the first portion, the second portion, and the middle portion of the flexible display member spread to be flat.

Concisely, according to embodiments of the present invention of a hinge assembly and a foldable display device using the hinge assembly, when the foldable display device is being spread, the first plate member and the second plate member is moving away from each other along with the increase of a spreading angle. When the foldable display device is completely spread and is in a spreading state, the first side and the second side are spaced by a predetermined distance. The predetermined distance is corresponding to a middle portion of a flexible display member, which allows the flexible display member to form an even, flat surface. As a result, the issue of the prior art that a middle portion of a foldable display device humps when the foldable display device is spread can be solved.

DETAILED DESCRIPTION OF ILLUSTRATIVE EMBODIMENTS

Figure 1:
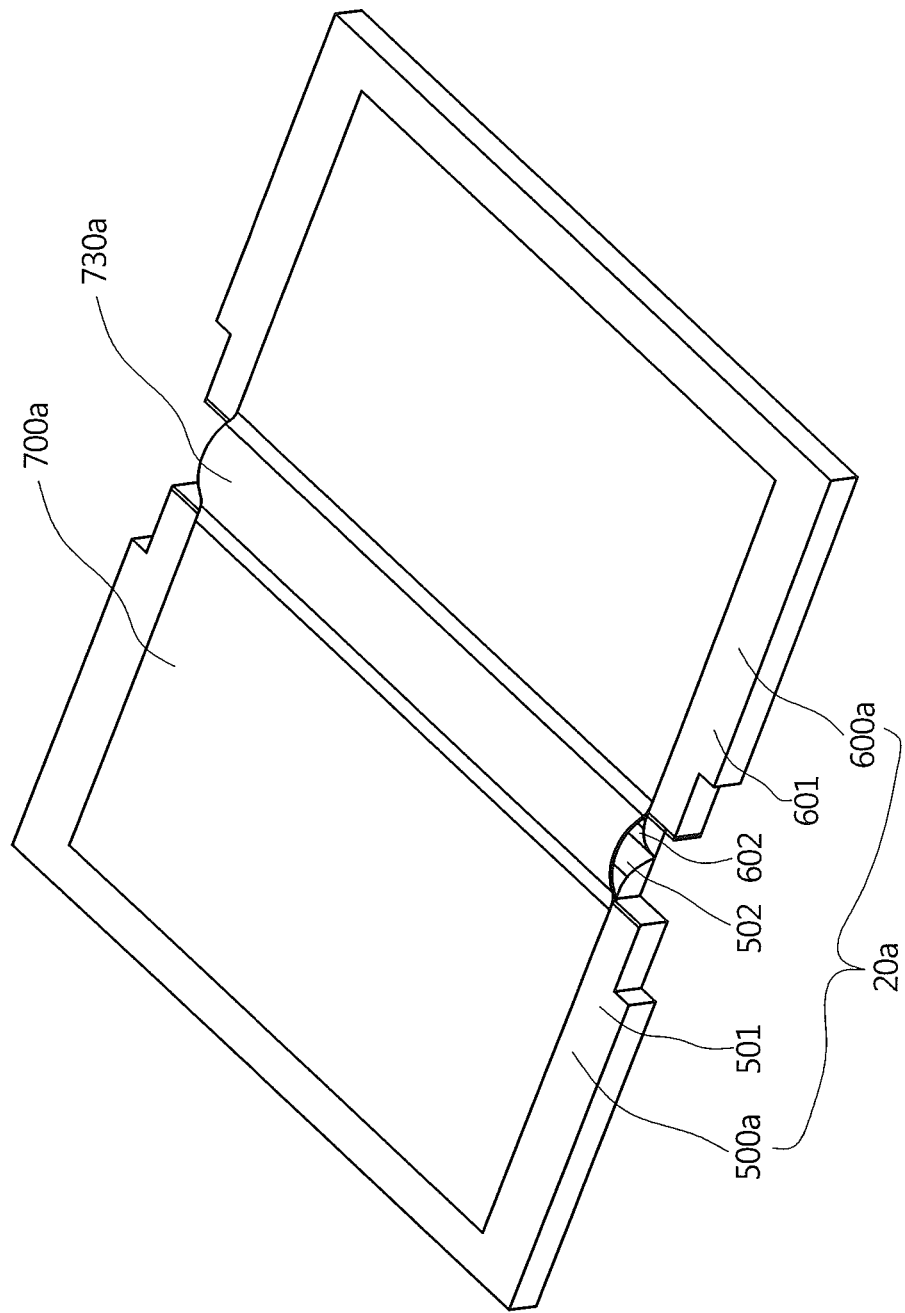
FIG. 1 illustrates a perspective view of a foldable display device according to a prior art.
Figure 2:
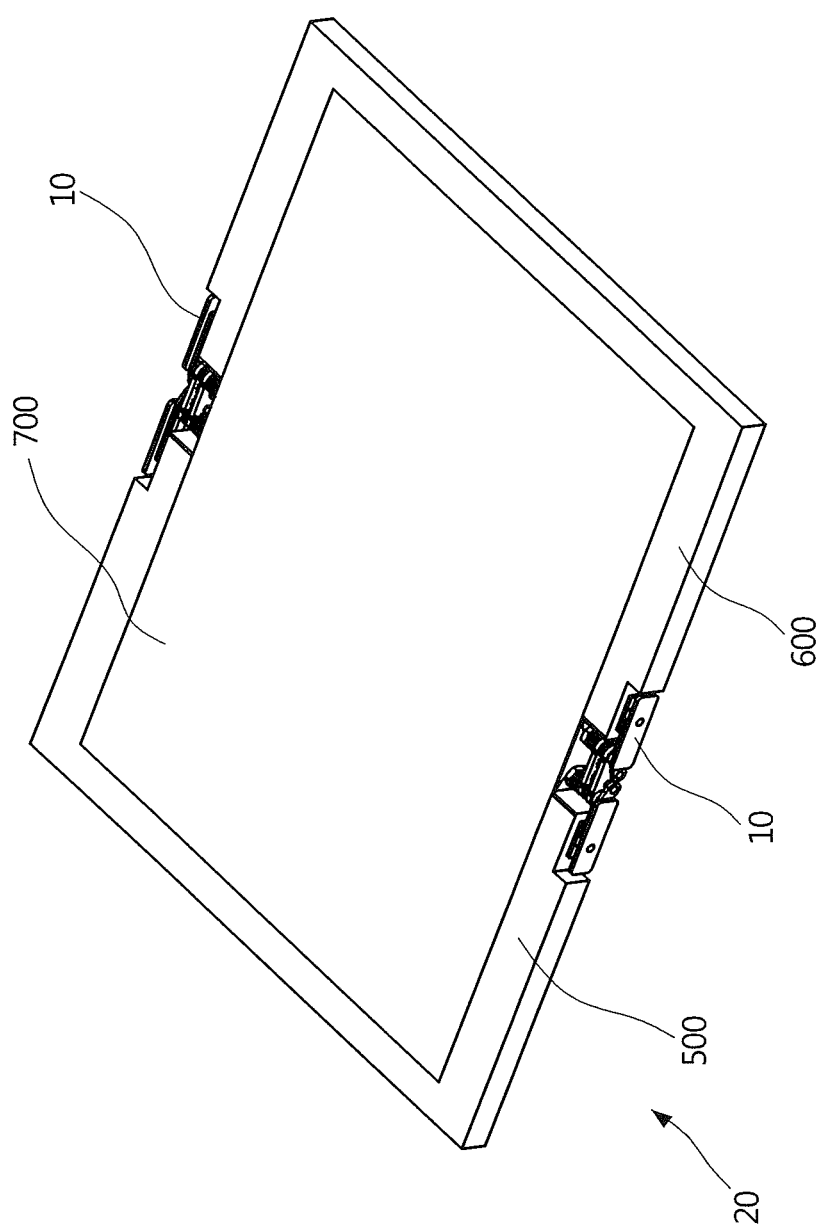
FIG. 2 illustrates a perspective view of a foldable display device according to an embodiment of the present invention.
Figure 3:
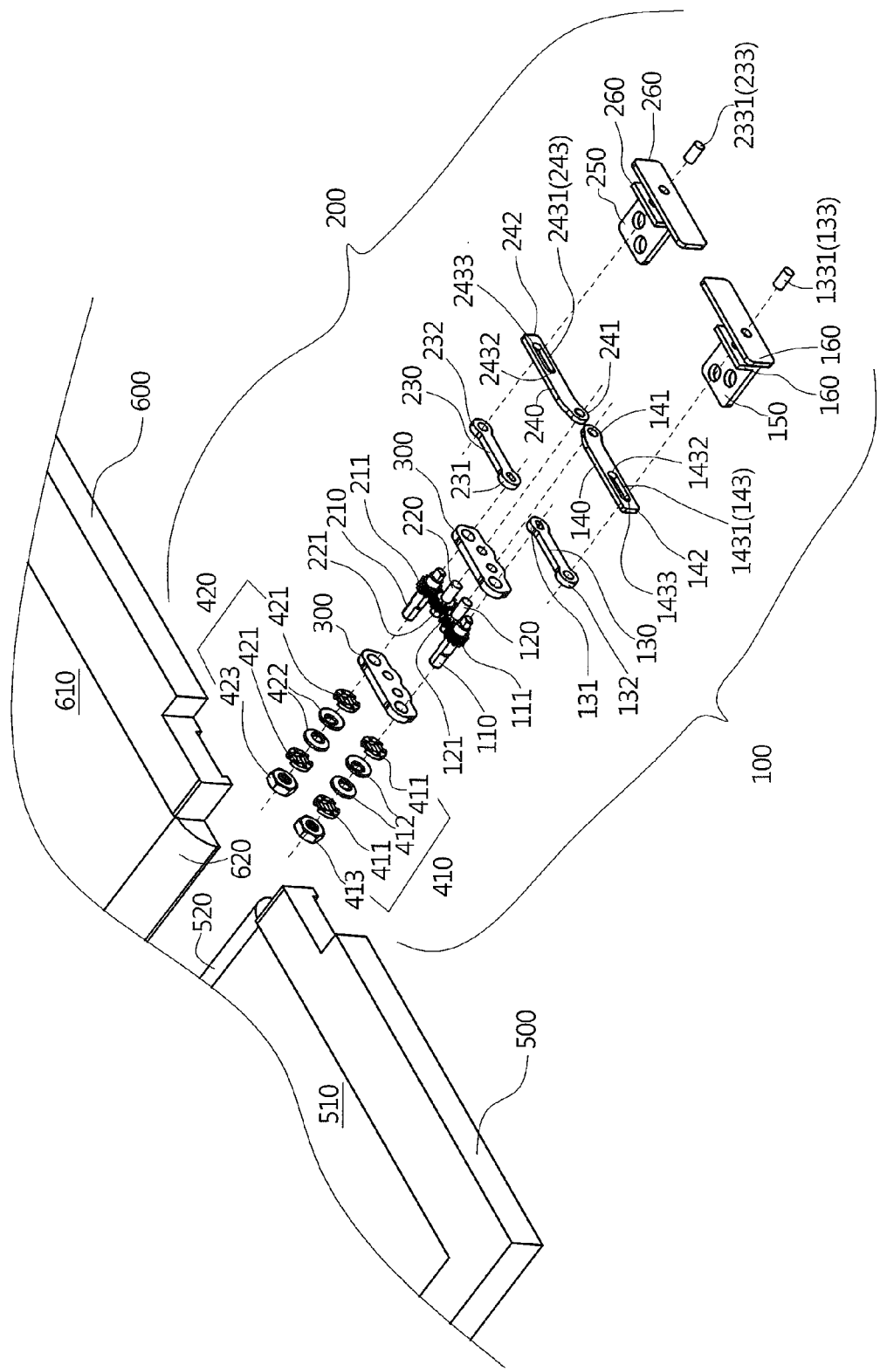
FIG. 3 illustrates an exploded view of the foldable display device according to an embodiment of the present invention.
Figure 3A:
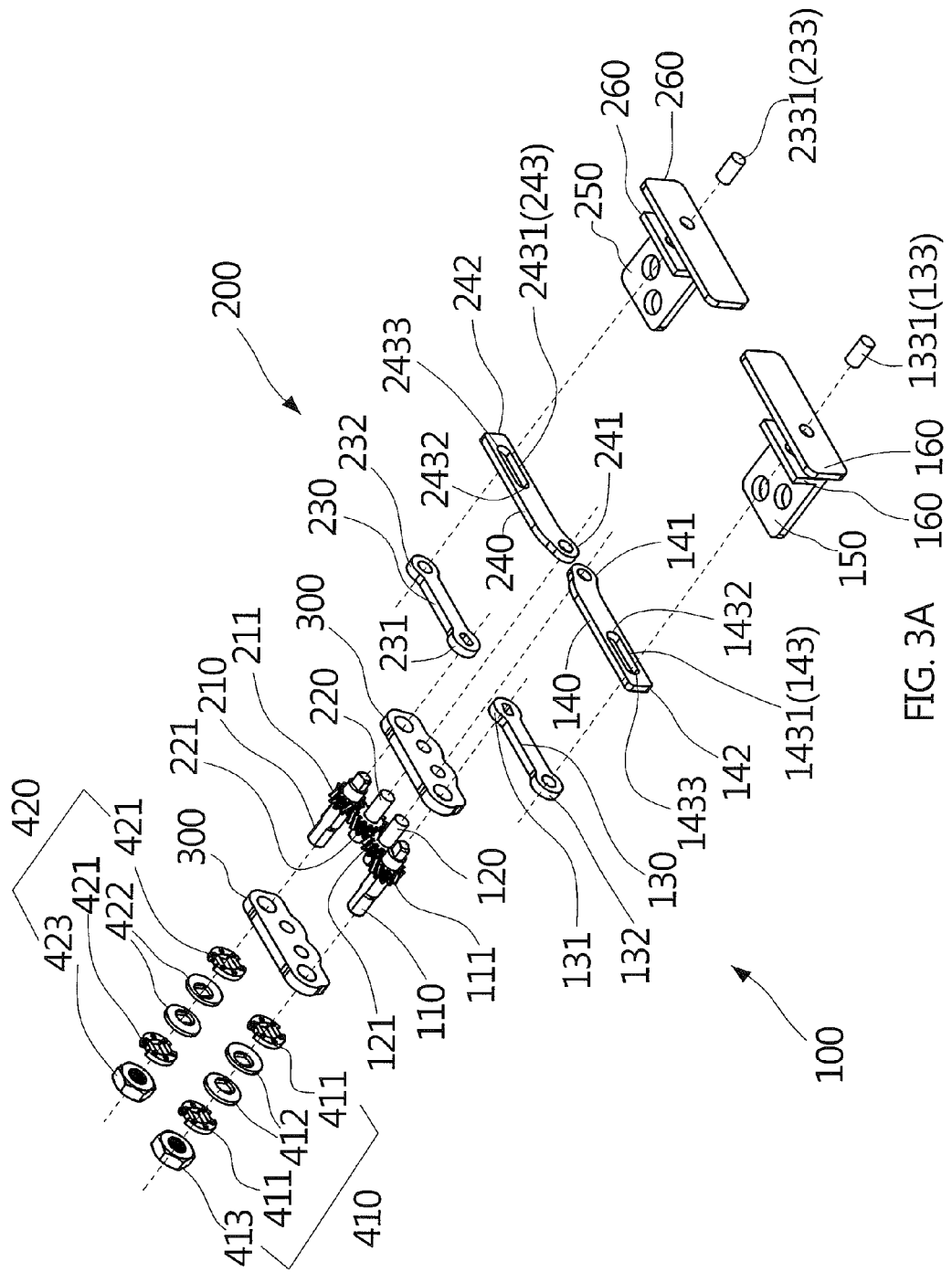
FIG. 3A illustrates an enlarged view of a hinge assembly of FIG. 3.

Please refer to FIGS. 2, 3, and 3A. FIG. 2 illustrates a perspective view of a foldable display device 20 according to an embodiment of the present invention. FIG. 3 illustrates an exploded view of the foldable display device 20 according to an embodiment of the present invention. FIG. 3A illustrates an enlarged view of a hinge assembly 10 of FIG. 3. The foldable display device 20 comprises a first plate member 500, a second plate member 600, a hinge assembly 10, and a flexible display member 700. For example, the flexible display member 700 may be, but not limited to, a flexible organic light emitting diode (OLED) panel. As shown in FIG. 3, the first plate member 500 comprises a first display surface 510 and a first side 520 at a side of the first display surface 510. The second plate member 600 comprises a second display surface 610 and a second side 620 at a side of the second display surface 610. The first side 520 and the second side 620 are close to each other.

Figure 4:
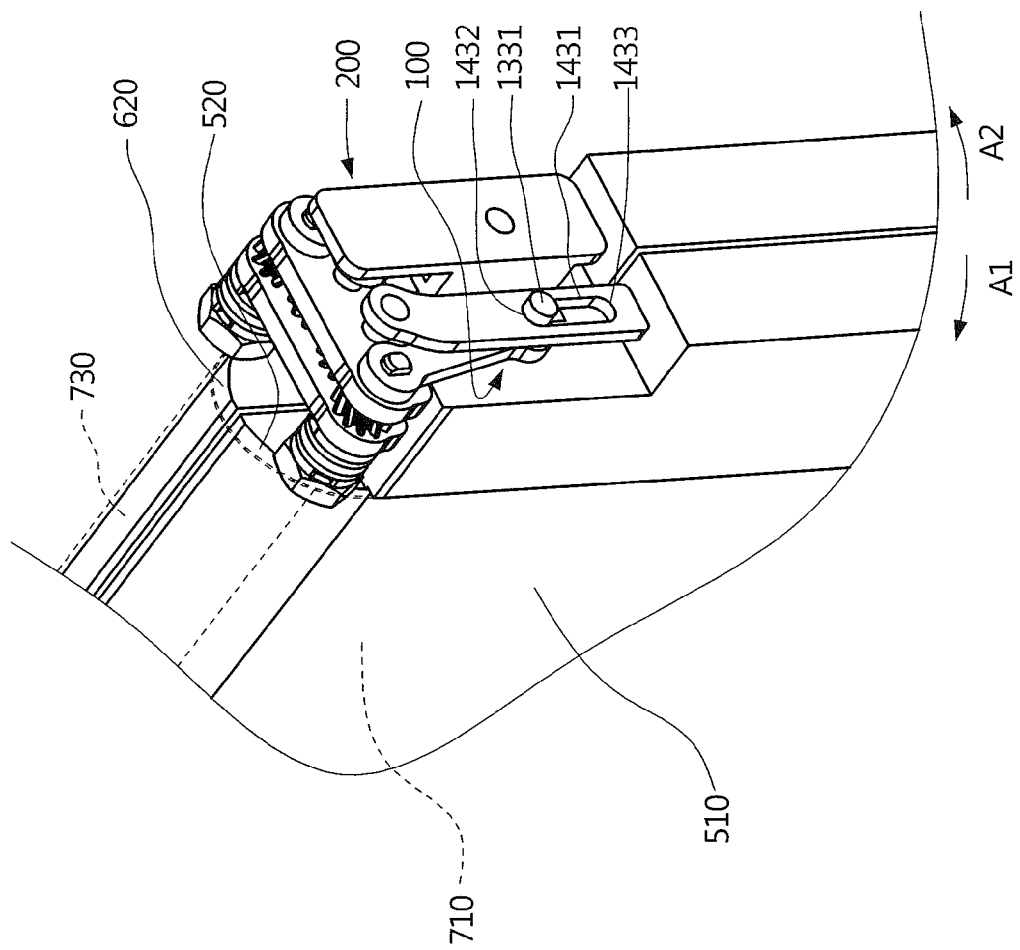
FIG. 4 illustrates a partially enlarged view of the foldable display device in a closing angle (0 degree) according to an embodiment of the present invention.
Figure 5:
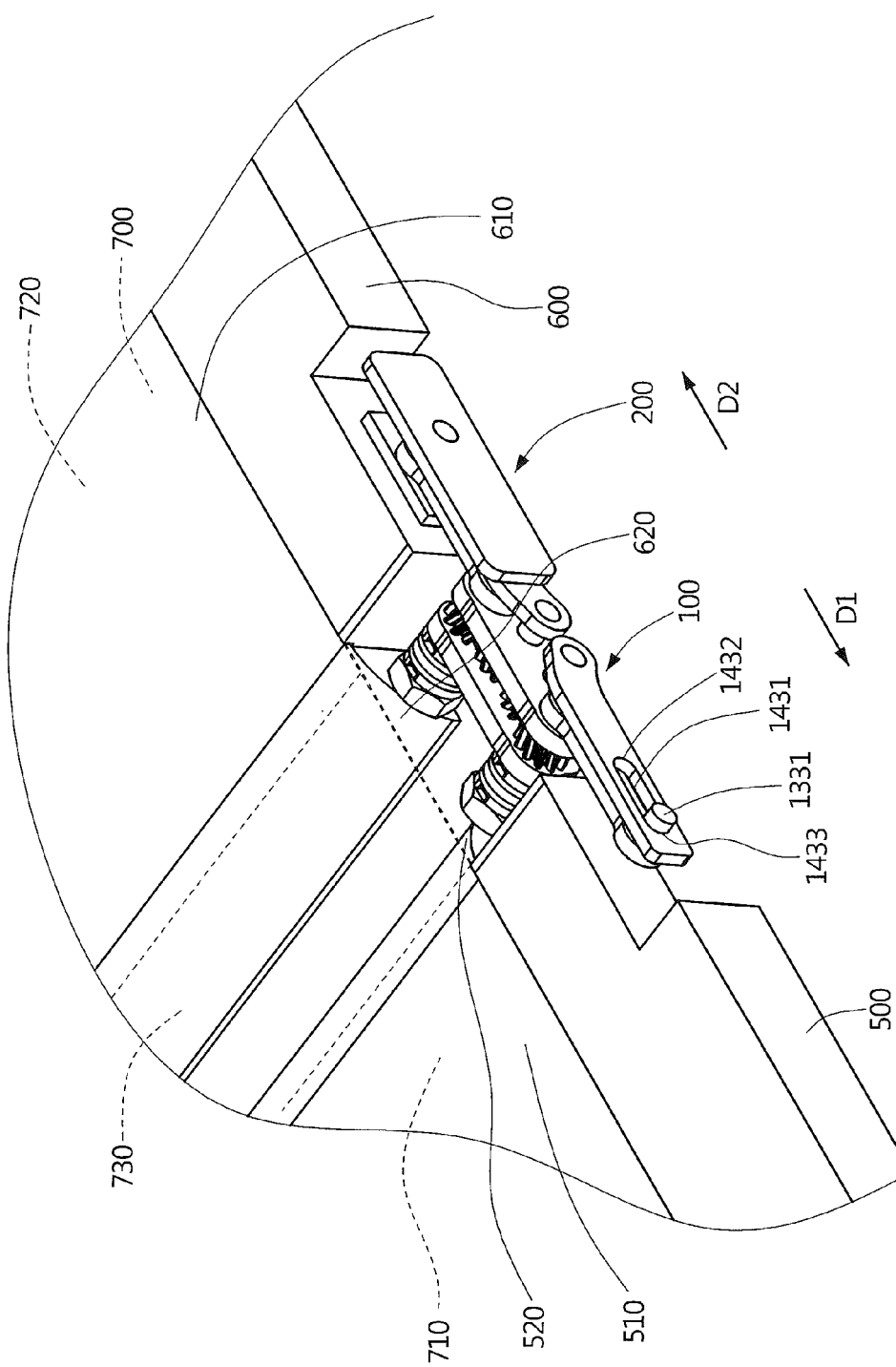
FIG. 5 illustrates a partially enlarged view of the foldable display device in a spreading angle (180 degrees) according to an embodiment of the present invention.

Please refer to FIGS. 4 and 5. FIG. 4 illustrates a partially enlarged view of the foldable display device 20 in a closing angle (0 degrees) according to an embodiment of the present invention. FIG. 5 illustrates a partially enlarged view of the foldable display device 20 in a spreading angle (180 degrees) according to an embodiment of the present invention. The flexible display member 700 comprises a first portion 710, a second portion 720, and a middle portion 730. The first portion 710 contacts the first display surface 510. The second portion 720 contacts the second display surface 610. The middle portion 730 is disposed between the first side 520 and the second side 620. As shown in FIGS. 3 and 3A, the hinge assembly 10 comprises a first hinge member 100 and a second hinge member 200. The first hinge member 100 and the second hinge member 200 are symmetrical to each other. In other words, all of components, relationships between components, and operations as a whole of the first hinge member 100 and the second hinge member 200 are all symmetrical.

As shown in FIG. 4, when the first hinge member 100 and the second hinge member 200 rotate relatively to a closing angle (herein the closing angle is defined as 0 degrees, meaning that the first hinge member 100 and the second hinge member 200 do not rotate comparing to an initial pose), the first plate member 500 and the second plate member 600 are folded. In the meantime, the middle portion 730 of the flexible display member 700 contacts the first side 520 of the first plate member 500 and the second side 620 of the second display member 600. More particularly, the middle portion 730 of the flexible display member 700 completely attaches to the first side 520 and the second side 620. In the embodiment, the first side 520 is an arc, the second side 620 is an arc. When the first hinge member 100 and the second hinge member 200 rotate relatively to the closing angle, the first side 520 and the second side 620 mutually form a semicircle. Meanwhile, the middle portion 730 of the flexible display member 700 completely attaches to the surface of the semicircle mutually formed by the first side 520 and the second side 620.

As shown in FIGS. 4 and 5, when the first hinge member 100 rotates in a clockwise direction A1, the second hinge member 200 rotates in a counterclockwise direction A2. While the first hinge member 100 and the second hinge member 200 are being gradually rotated relatively to a spreading angle (herein the spreading angle is defined as 180 degrees, meaning that the first hinge member 100 and the second hinge member 200 rotate respectively to 90 degrees and the sum of rotation is 180 degrees), the first plate member 500 is sliding towards a first direction D1 and moving a first distance; in the meanwhile, the second plate member 600 is sliding towards a second direction D2, which is opposite to the first direction D1, and moving a second distance. The first direction D1 and the second direction D2 are in reverse. Therefore, when the first plate member 500 and the second plate member 600 are completely spread, the first side 520 and the second side 620 are spaced from each other by a predetermined distance. The sum of the predetermined distance is equal to the first distance plus the second distance. That is to say, in a process of the first plate member 500 and the second plate member 600 being spread, the first plate member 500 and the second plate member 600 respectively slide in reverse directions to have the flexible display member 700 spread (pulled) to be flat. Thus, the flexible display member 700 does not hump as the middle portion in the prior art did. In other words, after the fordable display device 20 is fully open, the first portion 710, the second portion 720, and the middle portion 730 of the flexible display member 700 are on the same plane (being coplanar). The first portion 710, the second portion 720, and the middle portion 730 of the flexible display member 700 form an even, flat surface without any hump or depression.

As shown in FIGS. 3 and 3A, the first hinge member 100 comprises a first main axle 110, a first subordinate axle 120, a first main arm 130, and a first subordinate arm 140. The first main axle 110 further has a first main gear 111 formed thereon. The first subordinate axle 120 further has a first subordinate gear 121 formed thereon, and which is to be engaged with the first main gear 111. The first main arm 130 comprises a head portion 131 and an end portion 132 opposite to each other. The head portion 131 of the first main arm 130 forms a not-circle hole (not labeled) configured to match the shape of the first main axle 110 so as to be fixed to the first main axle 110. Therefore, when the first main axle 110 rotates clockwise or counterclockwise, the first main arm 130 is driven by the first main axle 110 and rotates clockwise or counterclockwise about the first main axle 110. The first subordinate arm 140 comprises a head portion 141 and an end portion 142. The head portion 141 of the first subordinate arm 140 is pivotally connected to the first subordinate axle 120. The end portion 132 of the first main arm 130 is slidably connected to the end portion 142 of the first subordinate arm 140. In the embodiment, the end portion 132 of the first main arm 130 is provided with a first main sliding unit 133, and the end portion 142 of the first subordinate arm 140 is provided with a first subordinate sliding unit 143. The first subordinate sliding unit 143 and the first main sliding unit 133 are slidably connected to each other. The second hinge member 200 is symmetrical to the first hinge member 100. The second hinge member 200 comprises a second main axle 210, a second subordinate axle 220, a second main arm 230, and a second subordinate arm 240. The second main axle 210 comprises a second main gear 211. The second main gear 211 is around and fixed to the second main axle 210. The second subordinate axle 220 comprises a second subordinate gear 221. The second subordinate gear 221 is around and fixed to the second subordinate axle 220. The second subordinate gear 221 is engaged with the second main gear 211 and the first subordinate gear 121. The second main arm 230 comprises a head portion 231 and an end portion 232. The head portion 231 of the second main arm 230 is fixed to the second main axle 210. Therefore, when the second main axle 210 rotates clockwise or counterclockwise, the second main arm 230 is driven by the second main axle 210 and rotates clockwise or counterclockwise about the second main axle 210. The second subordinate arm 240 comprises a head portion 241 and an end portion 242. The head portion 241 of the second subordinate arm 240 is pivotally connected to the second subordinate axle 220. The end portion 232 of the second main arm 230 is slidably connected to the end portion 242 of the second subordinate arm 240. In the embodiment, the end portion 232 of the second main arm 230 is provided with a second main sliding unit 233, and the end portion 242 of the second subordinate arm 240 is provided with a second subordinate sliding unit 243. The second subordinate sliding unit 243 and the second main sliding unit 233 are slidably connected to each other. Wherein, when the first hinge member 100 and the second hinge member 200 rotate relatively, the end portion 132 of the first main arm 130 is forced to slide on the end portion 142 of the first subordinate arm 140 (i.e., the first main sliding unit 133 and the first subordinate sliding unit 143 slide relatively) because the head portion 131 of the first main arm 130 is fixed to the first main axle 110, the head portion 141 of the first subordinate arm 140 is pivotally connected to the first subordinate axle 120, and the first main axle 110 and the first subordinate axle 120 are engaged with each other by the first main gear 111 and the first subordinate gear 121. Analogously, when the second main axle 210 rotates clockwise or counterclockwise, the end portion 232 of the second main arm 230 is forced to slide on the end portion 242 of the second subordinate arm 240 (i.e., the second main sliding unit 233 and the second subordinate sliding unit 243 slide relatively). It shall be noted that the first main axle 110 and the second main axle 210 are driven by the first subordinate gear 121 and the second subordinate gear 221 so that when the first main axle 110 rotates in the clockwise direction A1, the second main axle 210 will be forced to rotate in the counterclockwise direction A2. Based upon the aforementioned drive measure of the gears, the first plate member 500 and the second plate member 600 can be equiangularly spread (opened) and folded (closed) in synchrony.

In the embodiment, the first main sliding unit 133 comprises a sliding axle 1331, and the first subordinate sliding unit 143 comprises a sliding trough 1431. The sliding axle 1331 of the first main sliding unit 133 is slidably disposed in the sliding trough 1431 of the first subordinate sliding unit 143. The second main sliding unit 233 comprises a sliding axle 2331, and the second subordinate sliding unit 243 comprises a sliding trough 2431. The sliding axle 2331 of the second main sliding unit 233 is slidably disposed in the sliding trough 2431 of the second subordinate sliding unit 243. The first subordinate arm 140 comprises a bending segment. The bending segment of the first subordinate arm 140 is connected to the first subordinate axle 120. The bending segment of the first subordinate arm 140 is the head portion 141 of the first subordinate arm 140. The head portion 141 is further bended such that the first subordinate arm 140 as a whole is of an L shape. The second subordinate arm 240 comprises a bending segment. The bending segment of the second subordinate arm 240 is connected to the second subordinate axle 220. The bending segment of the second subordinate arm 240 is the head portion 241 of the second subordinate arm 240. The head portion 241 is further bended such that the second subordinate arm 240 as a whole is of an L shape. It is noted that in the embodiment, as shown in FIG. 4, the design of the bending segments of the first subordinate arm 140 and the second subordinate arm 240 may minimize the arrangement between each of the components so as to match the aforementioned design of the semicircle mutually formed by the first side 520 and the second side 620 described above.

In other embodiments, the sliding axle and the sliding trough may be in a reversed arrangement. For example, the first main sliding unit comprises a sliding trough, and the first subordinate sliding unit comprises a sliding axle. The sliding axle of the first subordinate sliding unit is slidably disposed in the sliding trough of the first main sliding unit. The second main sliding unit comprises a sliding trough, and the second subordinate sliding unit comprises a sliding axle. The sliding axle of the second subordinate sliding unit is slidably disposed in the sliding trough of the second main sliding unit. In such case, the first main arm comprises a bending segment, and the bending segment of the first main arm is connected to the first main axle. The second main arm comprises a bending segment, and the bending segment of the second main arm is connected to the second main axle.

In the embodiment, the sliding trough 1431 of the first subordinate sliding unit 143 comprises a first end 1432 and the second end 1433. The sliding axle 1331 of the first main sliding unit 133 can slide between the first end 1432 and the second end 1433 along with the rotation of the first hinge member 100. The sliding trough 2431 of the second subordinate sliding unit 243 comprises a first end 2432 and the second end 2433. The sliding axle 2331 of the second main sliding unit 233 can slide between the first end 2432 and the second end 2433 along with the rotation of the second hinge member 200.

As shown in FIGS. 3 to 5, the first hinge member 100 further comprises a first fixing plate 150. The first fixing plate 150 is connected to the first main sliding unit 133 and is slidably connected to the first subordinate sliding unit 143 of the first subordinate arm 140 along with the first main sliding unit 133. In addition, the first hinge member 100 further comprises two first clamping plates 160. The two first clamping plates 160 are fixed to the first fixing plate 150. The two first clamping plates 160 clamp the first main arm 130 and the first subordinate arm 140; therefore, the first main arm 130 and the first subordinate arm 140 can be restricted between the two first clamping plates 160 during rotation to keep the stability of the rotation. Additionally, the first fixing plate 150 is fixed to the first plate member 500, and the sliding axle 1331 of the first main arm 130 penetrates through and is disposed on the first clamping plate 160. As described above, when the first main axle 110 shown in FIG. 4 rotates in the clockwise direction A1 to the position shown in FIG. 5, the first main sliding unit 133 (i.e., the sliding axle 1331) of the first main arm 130 is forced to slide in the first subordinate sliding unit 143 (i.e., the sliding trough 1431) on the end portion 142 of the first subordinate arm 140. Moreover, in the embodiment, the sliding axle 1331 further penetrates through and is disposed on the first fixing plate 150, which makes the first fixing plate 150 and the first plate member 500 slide together in the first direction D1 to move a distance. The second hinge member 200 further comprises a second fixing plate 250. The second fixing plate 250 is connected to the second main sliding unit 233 and slidably connected to the second subordinate sliding unit 243 of the second subordinate arm 240 along with the second main sliding unit 233. In addition, the second hinge member 200 further comprises two second clamping plates 260. The two of the second clamping plates 260 are fixed to the second fixing plate 250. The two of the second clamping plates 260 clamp the second main arm 230 and the second subordinate arm 240; therefore, the second main arm 230 and the second subordinate arm 240 can be restricted between the two second clamping plates 260 during rotation to keep the stability of the rotation. The second fixing plate 250 is fixed to the second plate member 600, and the sliding axle 2331 of the second main arm 230 is pivotally connected to the second clamping plate 260. As aforementioned description, when the first main axle 110 shown in FIG. 4 rotates in the clockwise direction A1 to the position shown in FIG. 5, the first subordinate gear 121 drives the second subordinate gear 221 to make the second main axle 210 rotate in the counterclockwise direction A2. The second main sliding unit 233 (i.e., the sliding axle 2331) of the second main arm 230 is forced to slide in the second subordinate sliding unit 243 (i.e., the sliding trough 2431) on the end portion 242 of the second subordinate arm 240. Moreover, in the embodiment, the sliding axle 2331 further penetrates through and is disposed on the second fixing plate 250, which makes the second fixing plate 250 and the second plate member 600 slide together in the second direction D2 to move a distance. In other words, when a user pulls the first plate member 500 and the second plate member 600, stresses applied to the first plate member 500 and the second plate member 600 drive the first hinge member 100 and the second hinge member 200 rotate relatively to each other via the first fixing plate 150, the second fixing plate 250, the first clamping plate 160, the second clamping plate 260, the sliding axles 1331, 2331, the first main arm 130, and the second main arm 230 to make the first plate member 500 and the second plate member 600 respectively slide towards the first direction D1 and the second direction D2 to move a distance. Ultimately, the first portion 710, the second portion 720, and the middle portion 730 of the flexible display member 700 are completely spread (pulled) to be flat. In order to clearly show the first main arm 130 and the second subordinate arm 140 in FIGS. 4 and 5, the first fixing plate 150 and the first clamping plates 160 are omitted. The first hinge member 100 and the second hinge member 200 are symmetrical to each other; therefore, the structure of the first fixing plate 150 and the first clamping plates 160 clamping the first main arm 130 and the first subordinate arm 140 and pivotally connected to the sliding axle 1331 could be referred to that of the second fixing plate 250 and the second clamping plates 260 clamping the second main arm 230 and the second subordinate arm 240 and pivotally connected to the sliding axle 2331.

In the embodiment, the hinge assembly 10 further comprises two bracket plates 300 spaced from each other. The first main axle 110, the first subordinate axle 120, the second main axle 210, and the second subordinate axle 220 respectively penetrate through and are pivotally disposed on the two bracket plates 300. The bracket plates 300 improve the strength and the stability of the whole structure. In the embodiment, the first main gear 111, the first subordinate gear 121, the second main gear 211, and the second subordinate gear 221 are, but are not limited to, clamped between the two bracket plates 300.

In the embodiment, the hinge assembly 10 further comprises a first torsion member 410 and a second torsion member 420. The first torsion member 410 is disposed on the first main axle 110, and the second torsion member 420 is disposed on the second main axle 210. The first torsion member 410 comprises a plurality of annular units. The annular units comprise a rubbing pad 411, a plurality of elastic pads 412, and a nut 413. The second torsion member 420 comprises a plurality of annular units. The annular units comprise a rubbing pad 421, a plurality of elastic pads 422, and a nut 423. The torsion members, 410, 420 may be adopted by structures with which the people having ordinary skills in the art are familiar, and it is thus unnecessary to go into the details. The first torsion member 410 and the second torsion member 420 could provide adequate friction force to keep the first main axle 110 and the second main axle 210 in a relative posture.

Figure 6:
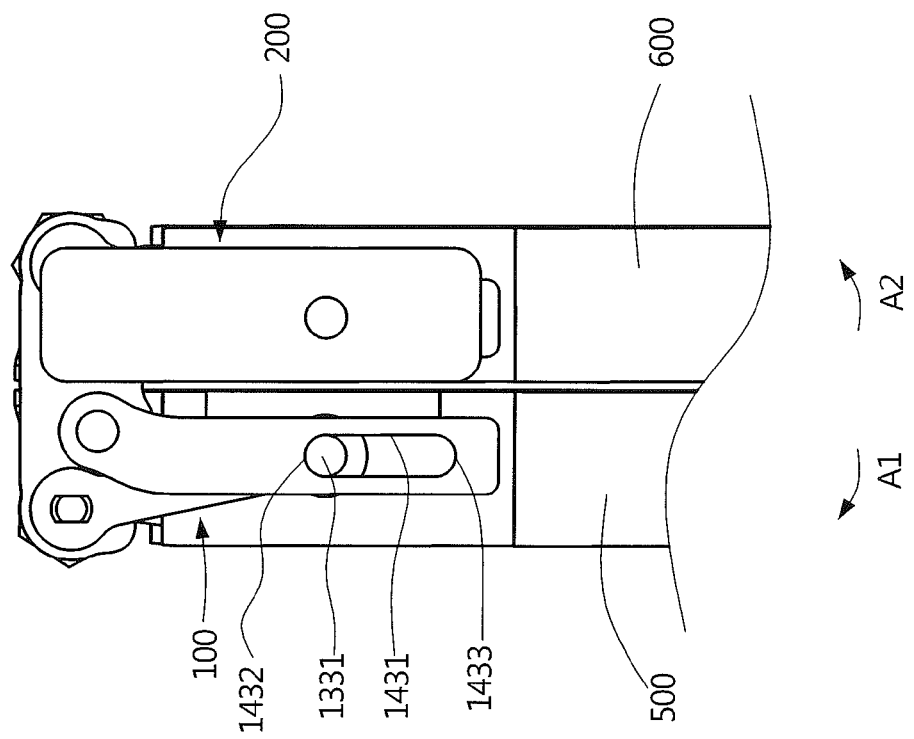
FIG. 6 illustrates a front view of the hinge assembly at 0 degrees according to an embodiment of the present invention.
Figure 7:
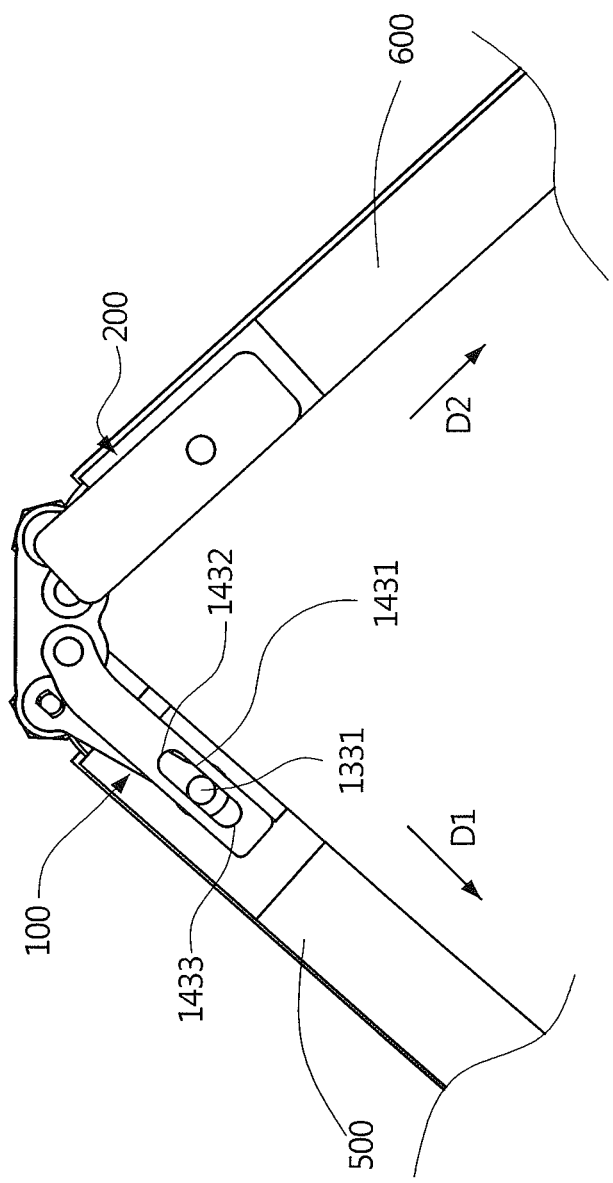
FIG. 7 illustrates a front view of the hinge assembly at 90 degrees according to an embodiment of the present invention.
Figure 8:
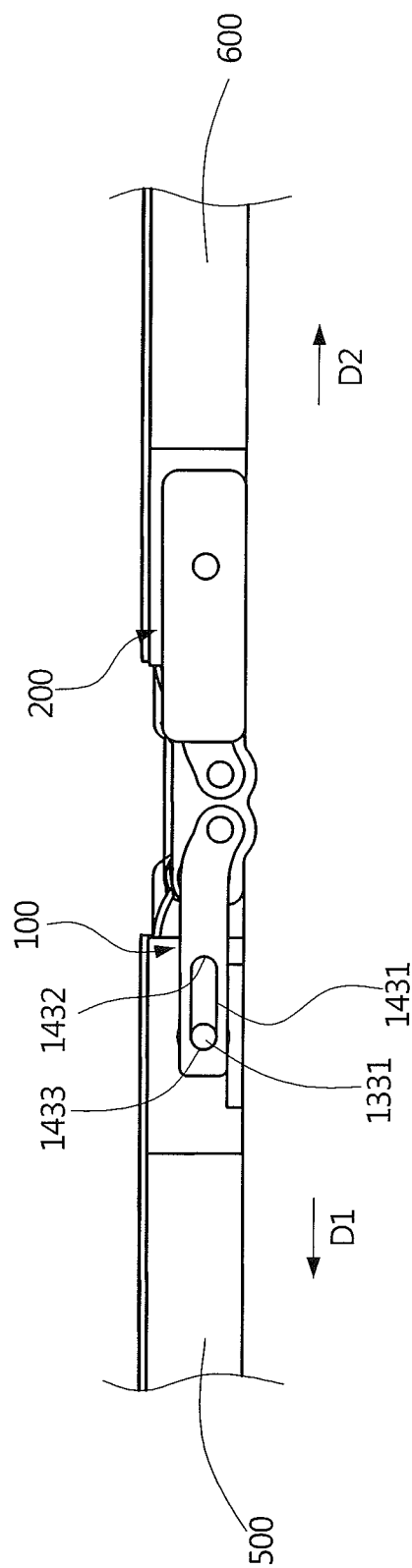
FIG. 8 illustrates a front view of the hinge assembly at 180 degrees according to an embodiment of the present invention.

Please refer to FIGS. 6 to 8. FIG. 6 illustrates a front view of the hinge assembly 10 at 0 degrees according to an embodiment of the present invention. FIG. 7 illustrates a front view of the hinge assembly 10 at 90 degrees according to an embodiment of the present invention. FIG. 8 illustrates a front view of the hinge assembly at 180 degrees according to an embodiment of the present invention. FIGS. 6 to 8 illustrate a process that the hinge assembly 10 at 0 degrees rotates to 180 degrees. Herein, the angle of the hinge assembly 10 is a sum of a rotation angle of the first hinge member 100 and a rotation angle of the second hinge member 200. As shown in FIG. 8, the first hinge member 100 and the second hinge member 200 respectively rotate to 90 degrees. The following primarily describes the operation of the first hinge member 100. The operation of the second hinge member 200 is symmetrical to that of the first hinge member 100 and is therefore referable to the following of the first hinge member 100. As shown in FIG. 6, while the hinge assembly 10 is at 0 degrees, the sliding axle 1331 of the hinge member 100 is at the first end 1432 of the sliding trough 1431. As shown in FIG. 7, while the hinge assembly 10 is at 90 degrees, the sliding axle 1331 of the hinge member 100 is between the first end 1432 and the second end 1433 of the sliding trough 1431. In other words, while the first hinge member 100 at 0 degrees rotates to 45 degrees, the first main arm 130 and the first subordinate arm 140 respectively rotate about the first main axle 110 and the first subordinate axle 120. The end portion 132 of the first main arm 130 is slidably connected to the end portion 142 of the first subordinate arm 140, such that the sliding axle 1331 and the sliding trough 1431 are forced to result in a relative displacement. While the sliding axle 1331 moves in the sliding trough 1431 from the first end 1432 to the second end 1433, the sliding axle 1331 pivotally connected to the first clamping plate 160 drives the first plate member 500 via the first fixing plate 150 to move towards the first direction D1; meanwhile, the sliding axle 2331 pivotally connected to the second clamping plate 260 drives the second plate member 600 via the second fixing plate 250 to move towards the second direction D2. Since the first hinge member 100 and the second hinge member 200 are symmetrical to each other, the directions of the movements of the first plate member 500 and the second plate member 600 are symmetrical to each other (i.e., to move away from each other). In other words, while the first hinge member 100 and the second hinge member 200 at 0 degrees respectively rotate to 45 degrees, the first plate member 500 and the second plate member 600 rotate relatively and move away from each other simultaneously. The relative displacement of the sliding axles 1331, 2331 and the sliding troughs 1431, 2431 cause the first plate member 500 and the second plate member 600 to be driven to move relatively. Thus a maximum displacement between the first plate member 500 and the second plate member 600 relates to lengths of the sliding trough 1431, 2431.

When the first hinge member 100 at 45 degrees continues to rotate to 90 degrees (the hinge assembly 10 rotates from 90 degrees to 180 degrees), the operation process is analogous to the above description such that it is unnecessary to go into the details. Ultimately, as shown in FIG. 8, when the hinge assembly 10 is at 180 degrees, the sliding axle 1331 of the first hinge member 100 is at the second end 1433 of the sliding trough 1431. In the situation, the first hinge member 100 and the second hinge member 200 is at the spreading angle. In other words, the first plate member 500 and the second plate member 600 are spread to 180 degrees, and the distance by which the first plate member 500 and the second plate member 600 are spaced reaches a predetermined maximum distance. The maximum distance between the first plate member 500 and the second plate member 600 being spaced from each other is corresponding to a width of the middle portion 730 of the flexible display member 700. As a result, the flexible display member 700 at the spreading angle presents an even, flat surface, and the middle portion 730 has no hump so as to reach the best effect in terms of displaying.

In the embodiments of the present invention, the first main axle 110 is not fixed to the first plate member 500, and the second main axle 210 is not fixed to the second plate member 600, either. The first fixing plate 150 is mainly utilized for fixing the first plate member 500 and the sliding axle 1331 capable of sliding, such that the first plate member 500 is able to slide towards the first direction D1 to move a distance (analogously, the second plate member 600 is able to slide towards the second direction D2 to move a distance). Consequently, in the process of the first plate member 500 and the second plate member 600 being spread to 180 degrees, the first side 520 of the first plate member 500 gradually moves away from the second side 620 of the second plate member 600. Thus the flexible display member 700 could be spread (pulled) to be flat.

It shall be understood by people having ordinary skills in the art that gears on the first main axle 110, the first subordinate axle 120, the second subordinate axle 220, and the second main axle 210 (including the first main gear 111, the first subordinate gear 121, the second main gear 211, and the second subordinate gear 221) are utilized for driving one other. The driving operation of the gears is ultimately to have the first plate member 500 and the second plate member 600 simultaneously rotate to the same angle but in reverse directions. For example, the second plate member 600 rotates counterclockwise while the first plate member 500 rotates clockwise. Nevertheless, there are several means to meet the function of driving. For example, the first subordinate gear 121 of the first subordinate axle 120 and the second subordinate gear 221 of the second subordinate axle 220 may be omitted, and the first main axle 110 may also be able to drive the second main axle 210 by other driving measures (e.g., gears, chains, or belts) known by people having ordinary skills in the art. For example, US patent applications with publication nos. 2015/0362958 and 2015/0267450 disclose driving devices/means, both of which may meet the function of allowing the first main axle to drive the second main axle.

Further, in another embodiment of the present invention, the head portion 131 of the first main arm 130 and the head portion 231 of the second main arm 230 are still respectively fixed to the first main axle 110 and the second main axle 210. Herein, the first subordinate axle 120 and the second subordinate axle 220 are omitted. The head portion 141 of the first subordinate arm 140 and the head portion 241 of the second subordinate arm 240 are respectively pivotally connected to the bracket plate 300 to meet the function originally provided by the first subordinate axle 120 and the second subordinate axle 220 pivotally connected to the bracket plate 300. Ultimately, the end portion 132 of the first main arm 130 is still slidably connected to the end portion 142 of the first subordinate arm 140, and the end portion 232 of the second main arm 230 is still slidably connected to the end portion 242 of the first subordinate arm 240. In the embodiment, the same function can be met. Moreover, the function of the first main axle driving the second main axle can be met by the driving means disclosed in US patent applications with publication nos. 2015/0362958 and 2015/0267450.

What is claimed is:

1. A hinge assembly, comprising:
a bracket plate;
a first hinge member disposed on the bracket plate, comprising:
a first main axle being pivotally connected to the bracket plate, comprising a first main gear, the first main gear being around and fixed to the first main axle;
a first subordinate axle being pivotally connected to the bracket plate, comprising a first subordinate gear, the first subordinate gear being around and fixed to the first subordinate axle, the first subordinate gear being engaged with the first main gear;

a first main arm with an end connected to the first main axle and an another end provided with a first main sliding unit; and a first subordinate arm with an end pivotally connected to the first subordinate axle and an another end provided with a first subordinate sliding unit, the first subordinate sliding unit and the first main sliding unit being slidably connected to each other; and a second hinge member disposed on the bracket plate, symmetrical to the first hinge member, the second hinge member comprising:

a second main axle being pivotally connected to the bracket plate, comprising a second main gear, the second main gear being around and fixed to the second main axle;

a second subordinate axle being pivotally connected to the bracket plate, comprising a second subordinate gear, the second subordinate gear being around and fixed to the second subordinate axle, the second subordinate gear being engaged with the second main gear and the first subordinate gear;

a second main arm with an end connected to the second main axle and an another end provided with a second main sliding unit; and a second subordinate arm with an end pivotally connected to the second subordinate axle and an another end provided with a second subordinate sliding unit, the second subordinate sliding unit and the second main sliding unit being slidably connected to each other.

2. The hinge assembly of claim 1, wherein the first main sliding unit comprises a sliding axle, the first subordinate sliding unit comprises a sliding trough, and the sliding axle of the first main sliding unit is slidably disposed in the sliding trough of the first subordinate sliding unit; the second main sliding unit comprises a sliding axle, the second subordinate sliding unit comprises a sliding trough, and the sliding axle of the second main sliding unit is slidably disposed in the sliding trough of the second subordinate sliding unit.

3. The hinge assembly of claim 2, wherein the first subordinate arm comprises a bending segment, the bending segment of the first subordinate arm is connected to the first subordinate axle, the second subordinate arm comprises a bending segment, and the bending segment of the second subordinate arm is connected to the second subordinate axle.

4. The hinge assembly of claim 1, wherein the first main sliding unit comprises a sliding trough, the first subordinate sliding unit comprises a sliding axle, and the sliding axle of the first subordinate sliding unit is slidably disposed in the sliding trough of the first main sliding unit; the second main sliding unit comprises a sliding trough, the second subordinate sliding unit comprises a sliding axle, and the sliding axle of the second subordinate sliding unit is slidably disposed in the sliding trough of the second main sliding unit.

5. The hinge assembly of claim 4, wherein the first main arm comprises a bending segment, the bending segment of the first main arm is connected to the first main axle, the second main arm comprises a bending segment, and the bending segment of the second main arm is connected to the second main axle.

6. The hinge assembly of claim 1, wherein the first hinge member further comprises a first fixing plate connected to the first main sliding unit and slidably connected to the first subordinate sliding unit of the first subordinate arm along with the first main sliding unit; the second hinge member further comprises a second fixing plate connected to the second main sliding unit and slidably connected to the second subordinate sliding unit of the second subordinate arm along with the second main sliding unit.

7. The hinge assembly of claim 1 further comprising another bracket plate spaced from each other, the first main axle, the first subordinate axle, the second main axle, and the second subordinate axle respectively penetrating through and being pivotally disposed on the two bracket plates.

8. The hinge assembly of claim 1, further comprising a first torsion member and a second torsion member, the first torsion member being disposed on the first main axle, the second torsion member being disposed on the second main axle.

9. A hinge assembly, comprising:
a bracket plate provided with a first hinge member and a second hinge member;
wherein the first hinge member comprises:
a first main axle pivotally disposed on the bracket plate, the first main axle comprising a first main arm with an end connected to the first main axle and an another end provided with a first main sliding unit; and
a first subordinate arm with an end pivotally connected to the bracket plate and an another end provided with a first subordinate sliding unit, the first subordinate sliding unit and the first main sliding unit being slidably connected to each other; and
wherein the second hinge member comprises:
a second main axle pivotally disposed on the bracket plate, the second main axle comprising a second main arm with an end connected to the second main axle and an another end provided with a second main sliding unit; and
a second subordinate arm with an end pivotally connected to the bracket plate and an another end provided with a second subordinate sliding unit, the second subordinate sliding unit and the second main sliding unit being slidably connected to each other.

10. The hinge assembly of claim 9, wherein the first main axle drives the second main axle by a driving device such that directions of rotation of the first main axle and the second main axle are in reverse, the first main sliding unit of the first main arm slides on the first subordinate sliding unit of the first subordinate arm, and the second main sliding unit of the second main arm slides on the second subordinate sliding unit of the second subordinate arm.

11. The hinge assembly of claim 10, wherein the first main sliding unit comprises a sliding axle, the first subordinate sliding unit comprises a sliding trough, and the sliding axle of the first main sliding unit is slidably disposed in the sliding trough of the first subordinate sliding unit; the second main sliding unit comprises a sliding axle, the second subordinate sliding unit comprises a sliding trough, and the sliding axle of the second main sliding unit is slidably disposed in the sliding trough of the second subordinate sliding unit.

12. The hinge assembly of claim 11, wherein the first hinge member further comprises a first fixing plate connected to the first main arm by the sliding axle of the first main sliding unit and slidably connected to the first subordinate arm along with the first main arm; the second hinge member further comprises a second fixing plate connected to the second main arm by the sliding axle of the second main sliding unit and slidably connected to the second subordinate arm along with the second main arm.

13. The hinge assembly of claim 12, wherein the first hinge member further comprises two first clamping plates, the two first clamping plates are fixed to the first fixing plate, and the two first clamping plates clamp the first main arm and the first subordinate arm; and the second hinge member further comprises two second clamping plates, the two second clamping plates are fixed to the second fixing plate, and the two second clamping plates clamp the second main arm and the second subordinate arm.

14. A foldable display device, comprising:
- a first plate member comprising a first display surface and a first side at a side of the first display surface;
- a second plate member comprising a second display surface and a second side at a side of the second display surface, the first side and the second side being close to each other;
- a hinge assembly of claim 9, the first hinge member being connected to the first plate member, the second hinge member being connected to the second plate member; and
- a flexible display member comprising a first portion, a second portion, and a middle portion, the first portion contacting the first display surface, and the second portion contacting the second display surface, the middle portion being between the first side and the second side,
- wherein, the first plate member and the second plate member are folded when the first hinge member and the second hinge member rotate relatively to a closing angle; and the first plate member and the second plate member respectively slide in reverse directions and move a distance when the first hinge member and the second hinge member rotate relatively to a spreading angle such that the first side and the second side are spaced from each other to have the first portion, the second portion, and the middle portion of the flexible display member spread to be flat.

15. The foldable display device of claim 14, wherein the first side is an arc, the second side is an arc, and the first side and the second side mutually form a semicircle when the first hinge member and the second hinge member rotate relatively to the closing angle.

* * * * *